United States Patent
Farrell (10) Patent No.: US 12,238,097 B2
(45) Date of Patent: Feb. 25, 2025

(54) REDUCING THE NUMBER OF KEYS USED TO SECURE IN-VEHICLE NETWORKS

(71) Applicant: GM GLOBAL TECHNOLOGY OPERATIONS LLC, Detroit, MI (US)

(72) Inventor: Brian Farrell, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 281 days.

(21) Appl. No.: 18/073,410

(22) Filed: Dec. 1, 2022

(65) Prior Publication Data

US 2024/0187409 A1   Jun. 6, 2024

(51) Int. Cl.
*H04L 9/40* (2022.01)
*B60R 16/023* (2006.01)

(52) U.S. Cl.
CPC ........ *H04L 63/0876* (2013.01); *B60R 16/023* (2013.01); *H04L 63/06* (2013.01)

(58) Field of Classification Search
CPC .... H04L 63/0876; H04L 63/06; B60R 16/023
See application file for complete search history.

(56) References Cited

U.S. PATENT DOCUMENTS

| | | | | |
|---|---|---|---|---|
| 10,009,325 B1 * | 6/2018 | David | .................... | H04L 9/16 |
| 10,104,094 B2 * | 10/2018 | Ichihara | .............. | H04W 12/121 |
| 10,211,990 B2 * | 2/2019 | Nairn | ...................... | G06F 21/64 |
| 10,623,402 B2 * | 4/2020 | Villavicencio | ........ | H04W 12/61 |
| 10,963,543 B2 * | 3/2021 | Takumi | ............... | G06F 21/6209 |
| 11,394,748 B2 * | 7/2022 | Yuan | ...................... | H04L 63/20 |
| 11,405,189 B1 * | 8/2022 | Bennison | ............ | H04L 63/0807 |
| 11,625,966 B2 * | 4/2023 | Carter | .................... | B64U 50/39 348/155 |
| 11,777,926 B2 * | 10/2023 | Pochuev | ............... | H04W 12/35 726/1 |
| 11,838,267 B2 * | 12/2023 | Levin | .................. | H04L 63/0263 |
| 12,088,728 B2 * | 9/2024 | Kalaiselvam | ......... | H04L 9/3242 |
| 2019/0116045 A1 * | 4/2019 | Markham | ........... | H04L 63/0876 |
| 2019/0347087 A1 * | 11/2019 | Farah | ....................... | G06F 8/65 |

\* cited by examiner

*Primary Examiner* — Viral S Lakhia
(74) *Attorney, Agent, or Firm* — Quinn IP Law (57) ABSTRACT

An electronic control unit (ECU), or node, is configured to use a single key for all virtual ECUs (V-ECUs) having a message to transmit. The ECU also may include a security peripheral that includes the stored shared key. The security peripheral may further include a policy enabling it to detect if a request from the V-ECU is valid, in which case it generates a MAC. The security peripheral is also used to store information in a MAC Generate Allow List (MGAL), which may define the policy about when the V-ECU can transmit. The ECU may include a crypto-engine, which stores shared keys from other nodes used to verify MACs transmitted by other nodes.

17 Claims, 3 Drawing Sheets

REDUCING THE NUMBER OF KEYS USED TO SECURE IN-VEHICLE NETWORKS

Modern vehicles have seen technological advancements in the amount of electronics relevant to both performance and luxury criteria. Electronic Control Units (ECUs), for example, are used in greater numbers as embedded systems within the vehicle that control different electromechanical systems. Modern vehicles include different ECUs for controlling a host of different systems that include engine control, powertrain control, transmission control, brake control, body and suspension control, general electrical functions, and the like. Well over one-hundred ECUs may populate a modern automobile, with each ECU including specialized embedded software that impose added complexity within the vehicle.

Because ECUs control critical vehicle functions like braking, acceleration, and engine functions, maintaining security is imperative. This includes verifying which messages are valid. Only authorized software entities in an ECU should be permitted to transmit messages, and only within the scope of their respective permission levels. With the continued proliferation of nodes and ECUs in modern vehicle, the acts of preserving security, including providing each entity a separate transmit key, tends to increase overall costs by requiring the manufacturer to purchase increasing amounts of money to accommodate these ECUs.

SUMMARY

In one aspect of the disclosure, an electronic control unit (ECU) of a vehicle is presented. The ECU includes a first memory configured to store a plurality of virtual-ECUs (V-ECUs). The ECU also includes a processor configured to selectively run at least one of the plurality of V-ECUs. The ECU further includes a security peripheral configured to store, in a second memory, (i) a single key for generating message authentication codes (MACs), the key shared by the plurality of V-ECUs for sending authorized messages, and (ii) a MAC Generate Allow List (MGAL).

The security peripheral is further configured to receive a MAC generation request from an identified V-ECU of the plurality of V-ECUs, wherein the MGAL comprises information relevant to an authentication policy, the information being sufficient to determine whether the identified V-ECU is permitted to send a message. The security peripheral is configured to use the key to generate a MAC authenticating the message when the identified V-ECU is permitted to send the message.

Another aspect of the disclosure includes an electronic control unit (ECU). The ECU includes a processor and a security peripheral coupled to the processor. The ECU further includes at least one memory coupled to the processor. The memory includes a plurality of virtual ECUs (V-ECUs), each of which, when loaded into the processor as executable code and when having a secure message to transmit, is configured to issue a message authentication code (MAC) request to the security peripheral with a single shared transmit key.

The security peripheral is configured to verify the MAC generation request and to use a policy to identify the V-ECU that sent the MAC generation request to determine whether the V-ECU is authorized to send the message to an identified recipient. The security peripheral thereupon generates the MAC upon authorizing the V-ECU.

In still another aspect of the disclosure, a method of an electronic control unit (ECU) node in a vehicle includes storing a single, shared secret key of a security peripheral of the node. The secret key is shared among virtual electronic control units (V-ECUs) in the node for transmitting messages. The method includes sending, by one of the V-ECUs, a request to the security peripheral to generate a message identification code (MAC) to accompany a protected message to be sent by the one V-ECU. The security peripheral identifies the one V-ECU. The method includes determining, by the security peripheral, whether the message is authorized to be sent by the identified V-ECU. The security peripheral generates the MAC if the message is deemed authorized but does not generate the MAC otherwise.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

The appended drawings are not necessarily to scale and may present a simplified representation of various features of the present disclosure as disclosed herein, including, for example, specific dimensions, orientations, locations, shapes and scale. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." For example, "optimal vehicle routes" may include one or more optimal vehicle routes. Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The principles of the present disclosure are directed to rendering security procedures more compact and efficient in entities like virtual ECUs ("V-ECUs") within a network node of a vehicle. The overall number of objects and instructions may be reduced within a node without reducing—and in some cases increasing—the effectiveness of the high security techniques within a node. Because these software-equipped ECUs control functions including braking, acceleration, and the like, maintaining adequate security in these instances is paramount. Third-party applications may be installed in the vehicle and used in conjunction with various ECUs. It is important to ensure that such applications are not able to thwart existing security protocols and spoof, for example, the node(s) required for braking in order to prevent a braking action by the driver. This is one of many examples of why security in these network nodes is important. ECUs may range from controlling the engine to the airbags to the brakes, and many other systems. An ECU may often receive inputs including information about whether to perform a certain task, and after performing some relevant computations using the input, the ECU may output data intended for an actuator to allow the actuator to perform some action based on a defined set of parameters.

An ECU ("Electronic Control Unit") is a device in a vehicle that controls one or more vehicle electrical systems. The ECU instructs the vehicle how to operate. In most cases, the core of an ECU is one or more processors that execute instructions of embedded software. A V-ECU is a software model of target ECU hardware that may assist in performing ECU functions and simulations, but that may be implemented purely in software, such as on the microprocessor of an ECU. V-ECUs advantageously enable vehicle functions to be tested using microcontrollers in laboratories before the functions are deployed in the vehicles to be sold, for example. Each instance of the V-ECU can be simply deployed with the test solution, after which the functionality may be thoroughly tested. For sophisticated ECUs, V-ECUs may be used as independent entities within the system to perform authorized tasks. ECUs may be configured to include the unmodified production code. As ECUs increase in the number and scope of quality of service (QoS) specifications along with the vehicle's increase in functionality, so too may the system's security requirements. System security refers in this case to the fact that the dozens of ECUs often present in a vehicle perform separate but critical functions, such as acceleration, ignition and braking, to name a few. System security means in this context that instructions to engage brakes should not be inadvertently or nefariously sent to an acceleration module to accelerate the vehicle, lest potentially catastrophic consequences may result. In short, a large number of events should be properly monitored as part of system security to ensure that instructions are issued only from an entity properly authorized to send the instruction, and that the scope of the instruction is proportionate to the authority of the issuing entity.

Existing solutions generally are relegated to assigning each V-ECU its own transmit key to prevent spoofing when generating messages, where spoofing in this context includes imitating another entity to convince the recipient of the message that the V-ECU is permitted to transmit the subject message. The subject message is generally to perform some action that the spoofing entity is not entitled to perform, whether innocuous to downright dangerous. A competing consideration is that vehicles are growing, sometimes exponentially, in their technological capabilities. As such, an increasing number of tasks may be automated. In the case of an ECU, the number of entities, or V-ECUs, within a single ECU is increasing. A competing consideration is that vehicles continue to become more technologically sophisticated. One result of these trends is that the number of V-ECUs within a single ECU is increasing.

In spite of these limitations, these ECU designs as noted are ordinarily intended to include one secret key for each V-ECU, in order to ensure that the V-ECUs cannot spoof each other in operation. Existing designs may also include some type of "crypto-engine" built into an example four V-ECU network host. At the outset prior to beginning of operations, this crypto engine may be populated with information or otherwise appropriately configured via hardware such that the crypto-engine knows which V-ECU is making the request of the four ECUs, since the crypto engine knows the key for each V-ECU. The crypto engine in this implementation is acting analogous to law enforcement, because if V-ECU 2 is trying to make a request to generate a message authentication code ("MAC") for a message using the key belonging to the V-ECU3, rather than its own key, then the Crypto Engine will know in advance that the wrong key is being used by V-ECU-2. As such, the Crypto Engine is not going to let the V-ECU 2 generate the MAC to perform the instruction it is not otherwise permitted to form. The request is therefore denied.

The above-referenced design works well for vehicles that can afford to use keys for each V-ECU. Numerous manufacturers, however, cannot use this solution because many of the V-ECUs that are still commonly used within the nodes of the manufacturer's vehicles continue to impose limitations on the allowed number of keys in the V-ECUs. Thus, while in some specialized cases, each V-ECU in a vehicle may have its own key, for the most part a different solution is desirable. Even if not prohibited as described above, an increasing number of keys within each node may increase the chances of software bugs, and inherent conflicts within the network of vehicle nodes.

Aspects of the present disclosure solve the aforementioned problems by designing a unique node or ECU that in turn, shares a single key for generating MACs among all V-ECUs within a node. The ECU directs that all V-ECU within an entity, prior to generating a MAC for sending its message, confirm that the message is both legitimate and sent from an authorized source in a manner described below.

Figure 1:
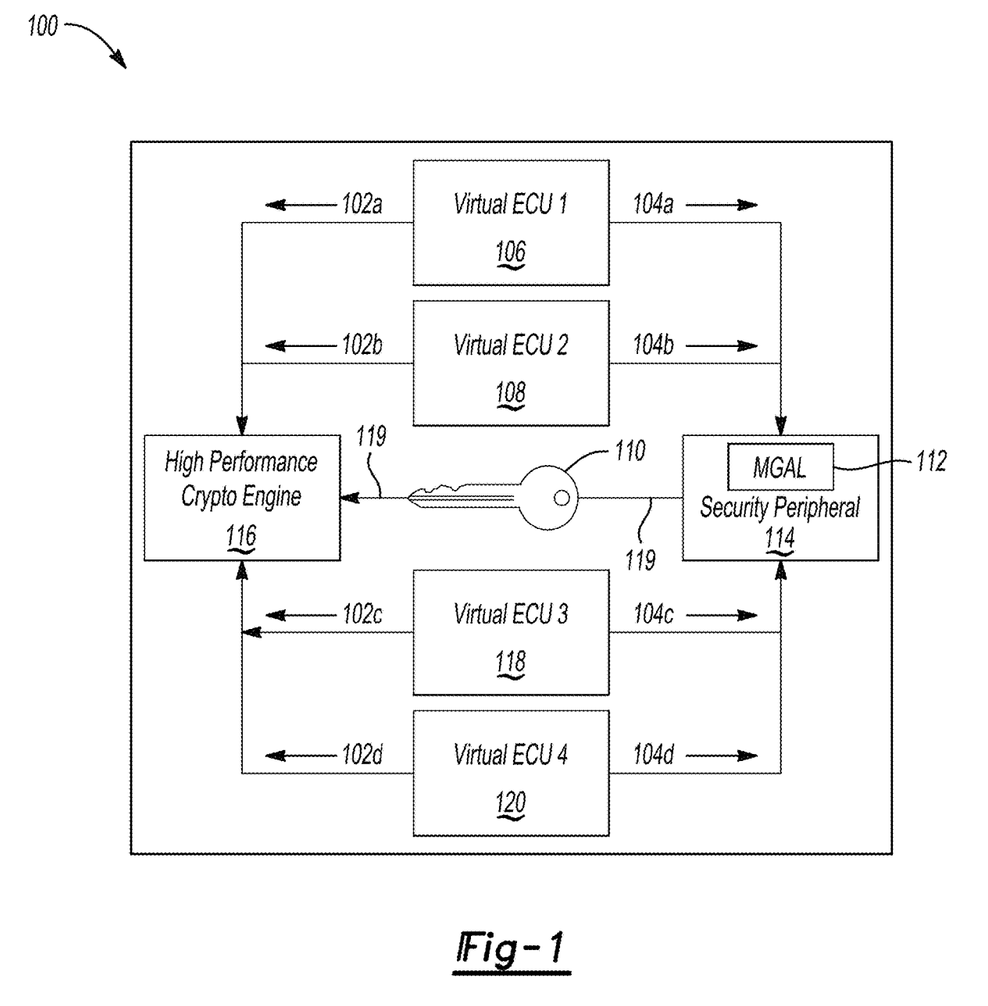
FIG. 1 is a conceptual diagram of a network node in a vehicle that allows a single key to be used by all entities within the node without compromising security.

Referring to the figures, wherein reference numerals are used to refer to like elements, FIG. 1 is a conceptual diagram of a network node 100 in a vehicle that allows a single key 110 to be used by all entities within the node without compromising security. In some configurations, the ECU may function largely as one integrated microprocessor or system-on-a-chip (SOC) for performing various functions, including the functions of V-ECUs 1-4 106, 108, 118, and 120. A different number of V-ECUs can be used depending on the type and complexity of the network node. However, because a plurality of different routines from different entities may be present in a single network node 100 sharing the same key for MAC generation, security may become particularly important. The current architecture may include embodiments where different software programs from different vendors may be each installed on a single node, wherein each of the different programs may be configured to perform different functions using the same microcontroller.

Referring still to FIG. 1, each of the V-ECU 1 (106), V-ECU 2 (108), V-ECU 3 (118) and V-ECU 4 (120) are all connected, respectively, to an entity called a High Performance Crypto Engine 116. The connection may be implemented, respectively, by conductors 102a, 102b, 102c, and 102d. Additionally, network node 100 includes a security peripheral 114. The security peripheral 114 may in various embodiments include a MAC Generate Allow List ("MGAL") 112. The security peripheral 114 may have access to the key via path 119, whether through software or otherwise.

The above-referenced problem concerning each entity (e.g., virtual ECU) within a network node 100 needing its own transmit key 110 to prevent spoofing is solved by directing that all MAC-generate requests pass through security peripheral 114. The security peripheral 114 includes an MGAL 112. The MGAL 112, in turn, is an authenticated policy used to ensure that the entity requesting the MAC generation is permitted to do so for the particular message that the V-ECU is attempting to send. The authenticated policy described above may be implemented in various ways with a high degree of reliability. For example, and without limitation, the security peripheral may use a known hardware interface configuration in which transmissions received via a first wire or trace 104a are known to come from V-ECU 1 (106), transmissions received via a second wire or trace 104b are known to come from V-ECU 2 108, transmissions received via a third wire or trace 104c are known to come from V-ECU 3 (118), and transmissions received via a fourth wire or trace 104d are known to come from V-ECU 4 (120). The authenticated policy and the wires or traces in other embodiments may be implemented, in part or in whole, in software without departing from the scope of the disclosure.

The security peripheral 114 is positioned within the network node 100 and may be used for internal policing using a policy in this case known as a MAC Generate Allow List (MGAL). This list may in one arrangement be a stored list of V-ECUs (e.g., V-ECU 1 106, V-ECU 2 108, V-ECU 3 118, and V-ECU 4 190), and the identity, permissions, and capabilities of the particular V-ECU, along with the data unique to the secret key 110, all to ensure that the secret key in the network node 100 can never be used to generate a MAC for messages that the v-ECU is not permitted to send.

As noted, the network node 100 may also include a High-Performance Crypto Engine 116, which may identify the shared key 110 via path 119. In various embodiments, the security peripheral 114 may be configured to load keys used by the network nodes for verifying the authenticity of MACs into the engine 116, such that the network node 100 can both generate and authenticate MACs to provide security for sending and receiving messages. Where a node is only used for generating authenticated messages, for example, the node may not use a crypto-engine 116.

The traces to the right of the V-ECUs in the example of FIG. 1,—namely traces 104a, 104b, 104c and 104d—are MAC generate traces. Stated differently, these traces are used by the corresponding V-ECU to request generation of a MAC for association with a message that the V-ECU would like to send. The traces on the left of the V-ECUs—i.e., traces 102a, 102b, 102c and 102d, are MAC verify traces, meaning that any of the V-ECUs can verify the MAC of a message sent to it by communicating with the High Performance Crypto Engine 116, as described further herein. Further, in various embodiments, the node (ECU) may include a microprocessor, network interface circuitry, at least one memory including a cache for storing executable code and received data, and other standard circuit components.

The architecture of FIG. 1 enables the vehicle to become more customizable and more updatable than those of known configurations. The architecture may enable a user to go to an application source, for example, such as an app store on a phone, and download software applications customizable for that person's vehicle, which software application can in turn be downloadable to one of the network nodes in the vehicle, such as the network node of FIG. 1. The new architecture as manifested in part herein is moving away from the existing architecture. That is, in present configurations in which numerous ECUs with their own transmit keys are included within the vehicle, the function(s) performed by each such ECU are the same functions that will be performed throughout the life of the vehicle. By contrast, the new vehicle design as described in embodiments herein reduce the number of static ECUs, replacing many of them with a dynamic, high performance cluster of microcontrollers or high performance systems-on-chips ("SoCs") having functions that are not static, but rather that can vary for the life of the vehicle. For example, using the proposed architecture, a user can add new services and capabilities for any of the nodes via the acquired apps. Also, the new clusters of nodes within the vehicle can sense that one microcontroller is overloaded, and as a result, a load-balancing routine can be initiated such that other microcontrollers take at least a portion of this work to thereby free the bogged-down microcontroller to take on other functions instead, or to complete its existing functions.

Figure 2:
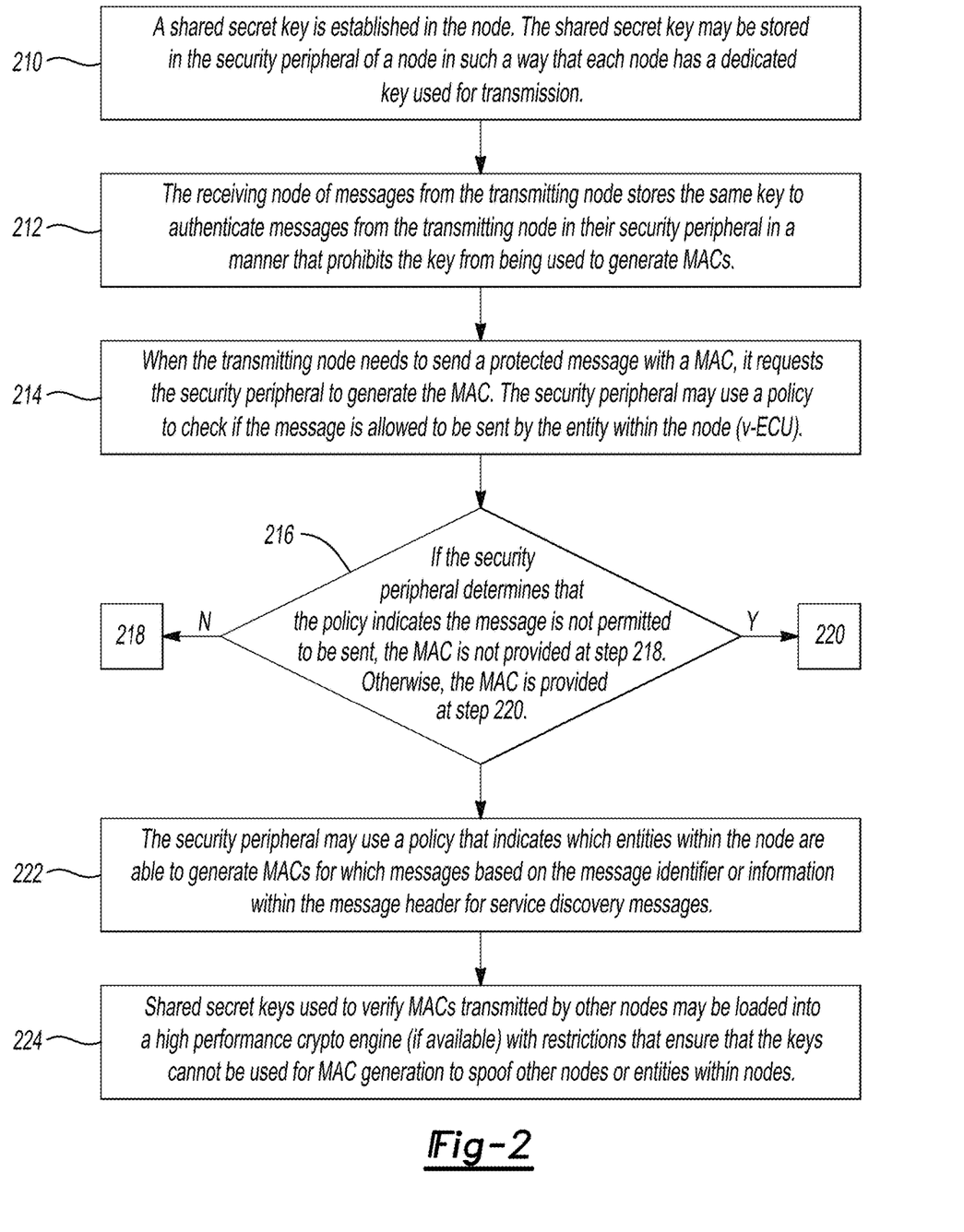
FIG. 2 is an exemplary flow diagram of a method for identifying which virtual entities within a network node are authorized to generate MACs, and for which messages.

FIG. 2 is an exemplary flow diagram of a method for identifying which virtual entities within a network node are authorized to generate MACs for their respective messages. The method of FIG. 2 may be performed by the network node 100, any of the V-ECUs, the security peripheral 114 in some embodiments, and the crypto engine 116. At step 210, a shared secret key 110 is established in the node 100. That is, the shared secret key may be stored in the security peripheral of a node in such a way that each node has a dedicated key used to request generation MACs for transmission of authorized messages. At step 212, the receiving node of messages from the transmitting node stores the same key to authenticate messages from the transmitting node in their security peripheral in a manner that prohibits the key from being used to generate MACs. For example, in embodiments where high performance crypto engines are available, the shared secret key used can be used to verify MACs transmitted by other nodes, while restrictions ensure that the keys cannot be used for MAC generation.

At step 214, when the transmitting node needs to send a protected message with a MAC, it requests the security peripheral to generate the MAC. The security peripheral may use a policy to check if the message is allowed to be sent by the entity within the node (v-ECU). At step 216, if the security peripheral determines that the policy indicates the message is not permitted to be sent, the MAC is not provided at step 218. Otherwise, the MAC is provided at step 220.

At step 222, the security peripheral may use a policy that indicates which entities within the node are able to generate MACs for which messages based on the message identifier or information within the message header for service discovery messages.

At step 224, share secret keys used to verify MACs transmitted by other nodes may be loaded into a high performance crypto engine (if available) with restrictions that ensure that the keys cannot be used for MAC generation to spoof other nodes or entities within nodes.

Typically, dozens to well over one-hundred network nodes may be distributed across a vehicle for performing different functions. Each node is typically configured to perform a range of related functions (e.g., those related to the transmission, for example.). As another example, the various features and functions governing the ignition process may be integrated in one or more additional network nodes. Even though the network nodes may each be configured to perform a suite of related functions, as noted, the software governing those functions (e.g., the V-ECUs) may be supplied by different vendors and can perform different functions relevant to the ignition process. One objective in this context is to integrate related functions together without compromising security. In an example situation where one of the programs has a bug or error that may potentially be exploited, it is desirable to frame the microcontroller in a manner that does not allow the corrupt V-ECU to spread its functionality to other V-ECUs within the same node or to attempt to spoof or imitate other V-ECUs being executed on the same micro-controller 100, The structure identified in FIG. 1 is a manifestation of a network node in a software defined vehicle ("SDV"). A plurality of shared secret keys are established in a respective plurality of nodes (ECUs), such that each node has one dedicated key used for transmission of messages by the entities to other V-ECUs or other nodes. The receiving nodes store the same key to authenticate messages from transmitting nodes in their respective security peripherals in a manner that prohibits the key from being used to generate MACs. When one of the entities within a transmitting node requests the node to send a protected message along with a MAC, the node requests that the security peripheral generate the MAC. The security peripheral thereupon may use a policy to check whether the message is permitted to be sent by the requesting entity (e.g., V-ECU) within the node. If the policy indicates that the message is not permitted to be sent, the security peripheral does not provide the MAC to the requesting entity.

Advantageously, in the above architecture, the network node need only have one key for each V-ECU to use to generate a MAC to send a message. Before generating the MAC, the V-ECU may seek authorization from the security peripheral. The security peripheral may use a policy that indicates which entities within the node are authorized to generate MACs based on the key, and for which types of messages. In various configurations, the security peripheral may base this policy on the message identifier, information within the message header for service discovery messages, and other criteria. In some cases, the security peripheral includes an MGAL, which stores information about the different V-ECUs and their relative privileges for transmitting messages.

In various embodiments, shared secret keys used to verify MACs transmitted by other nodes may be loaded into a high performance crypto engine, the latter of which may include restrictions to help ensure that the keys cannot be used for MAC generation, whether to spoof other nodes or entities within nodes, or for other potentially nefarious purposes.

Advantageously, using the embodiments identified above, performance may be optimized by using the high performance crypto engine for MAC verification operations, by limiting the use of MACs for verification rather than for message generation purposes. Performance may also be optimized by the nodes only performing access request inspections for MAC generate requests. As another benefit, only one transmit key is needed per node, rather than requiring a unique key per entity (V-ECU) within the node. This configuration may dramatically reduce the key slots required by all nodes on the network while maintaining the level of security provided by having a unique key for each entity within the node.

Another advantage of the principles of the disclosure is that performance can be optimized by using a high performance crypto engine, in some embodiments, for fast MAC verification operations. Performance is further beneficially optimized by only performing access request inspection at the security peripheral for MAC generate requests. As noted, these factors also militate that only one transmit key is needed per node, rather than having a unique key for each entity within the node, as in known implementations.

Aspects of the disclosure are accomplished via the use of a security peripheral arranged within the transmitting node (e.g., ECU) to perform the intended internal policing that in turn ensures that the secret key within the node or ECU cannot be used to generate a MAC for accompanying messages that the entity within the node is not authorized to send. In further aspects, the security peripheral loads keys used for verifying MACs into a high-performance crypto engine (as opposed to generating MACs for messages to be sent). In connection with loading each of the keys, the security peripheral may impose restrictions on the crypto engine that ensure that the keys in the crypto engine are used exclusively for MAC verification.

Cryptography techniques allocate the use of a secret key to each entity in a node with multiple entities to ensure that messages sent from one of the entities is from a known source. In these aspects, all V-ECUs in an ECU will have one key which they share. Taking the example with the network node (ECU) only including four total V-ECUs, the network node is also equipped with a security peripheral. So, each V-ECU has one key for generating messages with a MAC, but in order to use the key to generate a message, the V-ECU at issue has to send the key to the security peripheral. In some embodiments, the security peripheral may include its own processing circuit, integrated circuit, application-specific integrated circuit (ASIC), digital signal processor (DSP), or the like.

Various embodiments facilitate this capability by performing the following steps. First, a plurality of shared secret keys are established in a respective plurality of nodes, such as ECUs, such that each node has one dedicated key used for generation of MACs to accompany transmitted messages by the entities in the node. Each of the receiving nodes stores the same key to verify authenticate messages from transmitting nodes in their respective security peripherals in a manner that prohibits the key from being used to generate MACs. When one of the entities within a transmitting node requests the node to send a protected message along with a MAC, the node requests that the security peripheral generate the MAC. The security peripheral thereupon may use a policy to check whether the message is permitted to be sent by the requesting entity (e.g., V-ECU)

within the node. If the policy indicates that the message is not permitted to be sent, the security peripheral does not provide the MAC.

The security peripheral may use a policy that indicates which entities within the node are authorized to generate MACs for which types of messages. In various configurations, the security peripheral may base this policy on the message identifier, information within the message header for service discovery messages, and other criteria.

In various embodiments, shared secret keys used to verify MACs transmitted by other nodes may be loaded into a high performance crypto engine, the latter of which may include restrictions to help ensure that the keys cannot be used for MAC generation to spoof other nodes or entities within nodes.

Advantageously, using the embodiments identified above, performance may be optimized by using the high performance crypto engine for MAC verification operations, by limiting the use of MACs for verification rather than for message generation purposes. Performance may also be optimized by the nodes only performing access request inspections for MAC generate requests. As another benefit, only one transmit key is needed per node, rather than requiring a unique key per entity (V-ECU) within the node. This configuration may dramatically reduce the key slots required by all nodes on the network while maintaining the high level of security provided by having a unique key for each entity within the node.

The current architecture is particularly useful in embodiments where different software programs (e.g., v-ECUs) from different vendors may be each installed on a single node, wherein each of the different programs may be configured to perform different functions using the same microcontroller. Thus, even though the network node may still be configured to perform functions related to a particular vehicle object, the specific functions that may be performed are different. Thus, for example, the various features and functions governing the ignition process may be integrated in one network node. One objective in this context is to integrate related functions together while still maintaining security. In an example situation where, for example, if one of the programs has a bug or error that may potentially be exploited, it is desirable to frame the microcontroller in a manner that does not allow the corrupt V-ECU to spread its functionality to other V-ECUs within the same node or to attempt to spoof or imitate other V-ECUs being executed on the same micro-controller 100.

The structure identified in FIG. 1 is a manifestation of a network node in a software defined vehicle ("SDV"). A plurality of shared secret keys are established in a respective plurality of nodes (ECUs), such that each node has one dedicated key used for transmission by the entities therein. The receiving nodes store the same key to authenticate messages from transmitting nodes in their respective security peripherals in a manner that prohibits the key from being used to generate MACs. When one of the entities within a transmitting node requests the node to send a protected message along with a MAC, the node requests that the security peripheral generate the MAC. The security peripheral thereupon may use a policy to check whether the message is permitted to be sent by the requesting entity (e.g., V-ECU) within the node. If the policy indicates that the message is not permitted to be sent, the security peripheral does not provide the MAC to the requesting entity.

In short, the network node need only have one key for each V-ECU to use to generate a MAC to send a message. Before generating the MAC, the V-ECU seeks authorization from the security peripheral to generate the MAC to send the message. The security peripheral may use a policy that indicates which entities within the node are authorized to generate MACs for which types of messages. In various configurations, the security peripheral may base this policy on the message identifier, information within the message header for service discovery messages, and other criteria. In some cases, the security peripheral includes an MGAL, which may incorporate a list of relevant data about the V-ECUs in the nodes.

In various embodiments, shared secret keys used to verify MACs transmitted by other nodes may be loaded into a high performance crypto engine, the latter of which may include restrictions to help ensure that the keys cannot be used for MAC generation.

Advantageously, using the embodiments identified above, performance may be optimized by using the high performance crypto engine for MAC verification operations, by limiting the use of MACs for verification rather than for message generation purposes. Performance may also be optimized by the nodes only performing access request inspections for MAC generate requests. As another benefit, only one transmit key is needed per node, rather than requiring a unique key per entity (V-ECU) within the node. This configuration may dramatically reduce the key slots required by all nodes on the network while maintaining the level of security provided by having a unique key for each entity within the node.

Among other benefits, the use of software in the architecture of FIG. 1 enables the vehicle to become more customizable and more updatable. The architecture may enable the user, such as the owner of a vehicle, to go to an application source, for example, such as an app store on a phone, and download software applications customizable for that person, which software application can in turn be downloadable to one of the network nodes in the vehicle, such as the network node of FIG. 1. This new architecture is in contrast with the existing architecture, in which numerous ECUs are included within the vehicle, and the function (s) performed by each such ECU are the same functions that will be performed throughout the life of the vehicle. By contrast, the new vehicle design as described in embodiments herein reduce the number of static ECUs, replacing many of them with dynamic, high performance clusters of microcontrollers of high performance systems-on-chips ("SoCs") having functions that are not static, but rather that can vary for the life of the vehicle. For example, a user can add new services and capabilities for any of the nodes via the acquired apps. Also, the new clusters of nodes within the vehicle can sense that one microcontroller is overloaded, and as a result, a load-balancing routine can be initiated such that other microcontrollers take at least a portion of this work to thereby free the bogged-down microcontroller to take on other functions instead.

Figure 3:
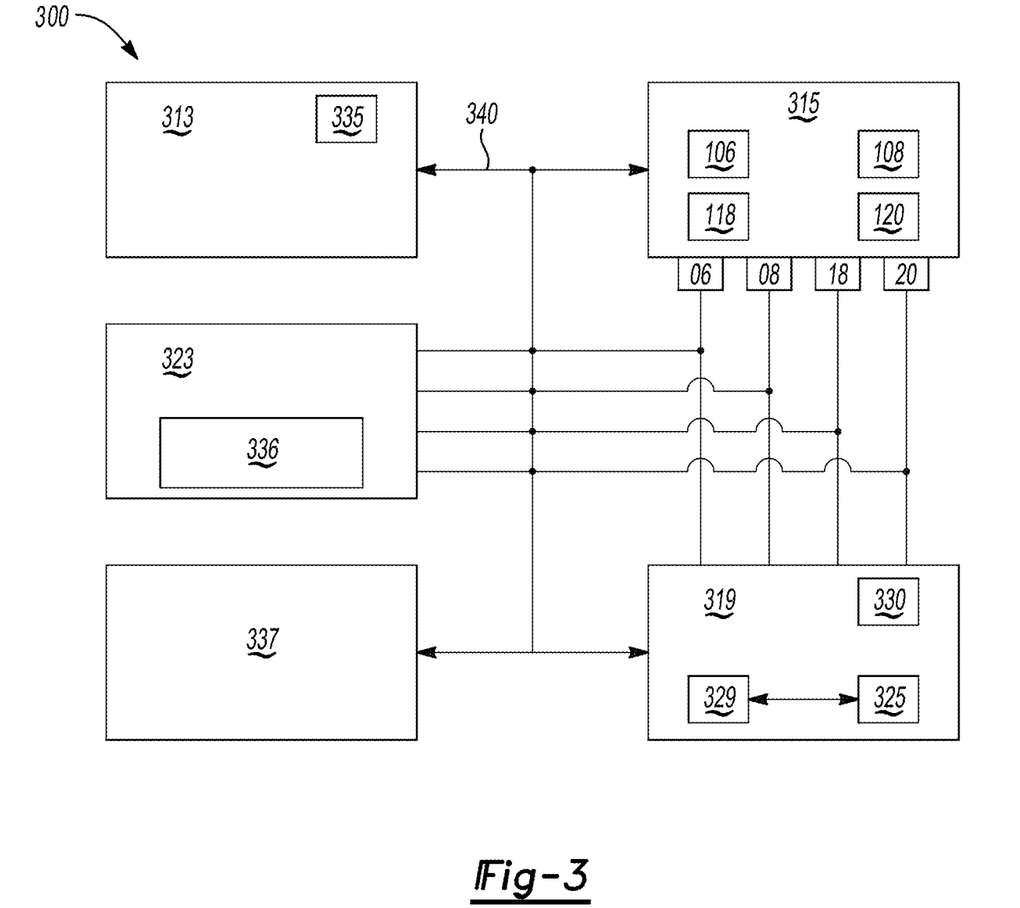
FIG. 3 is a block diagram of a hardware implementation of a network node ("ECU") according to various embodiments herein.

FIG. 3 is a block diagram of a hardware implementation of a network node ("ECU") 300 according to various embodiments herein. It will be appreciated that the ECU 300 disclosed is but one of various possible implementations. ECU 300 includes a main processor 313. The processor 313 may in some arrangements include more than one processor or controller. Processor 313 may include one or more central processing units. The functions performed by processor 313 may be performed in software, hardware, firmware, or a combination thereof. Thus, the processor itself may vary widely in its architecture. The processor 313 may include one or more general purpose processors, special purpose processors, complex instruction set computer (CISC) processors, reduced instruction set computer (RISC) processors. The processor 313 may include any number of cores and may include cache memory, busses, registers, and other similar processor components. In other cases, some or all of the functions may be performed in hardware. Thus processor 313 may include one or more digital signal processors (DSPs), systems-on-a-chip (SoCs), field programmable gate arrays (FPGAs), application-specific integrated circuits, dedicated logic circuits or any similar circuit for implementing functions in hardware, CPU(s) for executing code, or some combination thereof. If some or all functions are performed in software, the software may include or involve middleware, firmware, application programming interfaces or any other type of code. In some embodiments, processor 313 is part of a separate computer, used in tandem with other components for implementing the ECU 300.

Processor 313 may include a cache memory 335 for storing recently used code and data. Processor 313 may include memory 315. In some embodiments, memory 335 is a separate physical unit, and may include one or more of dynamic random-access memory (DRAM), static random access memory (SRAM), non-volatile memory, and other forms of memory. In some embodiments, memory 335 may be physically separate from the processor 313. Also shown coupled to processor via bus 340 is memory 315. In this embodiment, the memory includes code relevant to the four V-ECUs of FIG.—V-ECU 1 (106), V-ECU 2 (108), V-ECU 3 (118), and V-ECU 4 (120). In addition to these dedicated portions of code memory 315 may include other data and instructions needed for the ECU 300 to function. Coupled to processor 313 (via bus 340) and to memory 315 is security peripheral 319. Security peripheral 319 may include its own processor or controller 329. Security peripheral 319 may also include its own memory 325 for executing code or storing data. In addition, security peripheral 319 includes MGAL, which may include a list of information that enables security peripheral 319 to implement its policy for determining whether a particular V-ECU is authorized to use the secret key (e.g., stored in a secure region of memory 315 accessible to the security peripheral) to generate a MAC for the message provided by the V-ECU.

In this exemplary embodiment, the policy is implemented in part in hardware, and in part in software. For example, the MGAL 330 includes a list of which V-ECUs are entitled, if at all, to generate MACs for which messages/instructions. In addition, on the hardware side of the policy, security peripheral 319 has embedded within its memory specific non-volatile information about its ports. In this illustration, the port from memory labeled "06" means that the V-ECU received at that port is V-ECU 1 (106). The port from memory labeled "08" means that the V-ECU, if received from the memory 315 at that port, will be V-ECU 2 (108). If received from the port labeled 08, then security peripheral 319 can determine that the requesting V-ECU is V-ECU 3 (118), and so on for the port labeled "20," which only outputs V-ECU 4 (120). This is just one example of several hardware/software policies that can be implemented by the combination of the security peripheral 319 and its MGAL 330. Here, the security peripheral can monitor on which conductor the data/code is received, and from that, it can conclude which V-ECU is making the MAC-generate request. With that information, the security peripheral can consult the MGAL, which may include detailed information about the identified V-ECU and its specific policies. Provided those policies allow the identified V-ECU to send the message with the key-generated MAC, then the security peripheral can generate the MAC based on the key that it has permission to retrieve from the secure section in memory 315. The secret key used to generate the MACs may be stored in the memory within the security peripheral. The security peripheral 319 can then transmit the MAC (e.g., with the message) back to the processor 313 or relevant section of memory 315, whichever is appropriate under the circumstances.

Referring still to FIG. 3, ECU 300 also includes a network interface 337. This network interface may be used to communicate with other network nodes. In some embodiments, the receiving ECU/V-ECU may be on another node, in which case, the network interface 337 can output the data onto the appropriate bus to route the data to its destination. In addition, the network interface 337 may receive data from other nodes or V-ECUs therein.

In some embodiments, the ECU 300 may further include high-performance crypto engine 323. In these embodiments, keys used by the network nodes for verifying MACs may be loaded into the high-performance crypto-engine 116, when available, by the security peripheral 319, subject specifically to restrictions to only allow the key to be used for verification of MACs and not for MAC generation. The security peripheral can output this data to the engine 323 via the unique set of traces extending to engine 323, or the key can be loaded onto the lower portion of the bus 340 and addressed to the same recipient(s). The crypto-engine 323 may include a memory 336 for storing necessary data and code. Separately, the crypto-engine 323 may include hardware for executing code, enforcing the restrictions, and performing other tasks.

In various aspects, the shared secret keys loaded into the crypto-engine 323 are specifically used for verification of MACs transmitted by other nodes (e.g., via network interface 337). Here again, the crypto-engine 323 is provided restrictions to ensure that the keys used for verification of messages from other nodes cannot be used for MAC generation to spoof other nodes, or V-ECUs within nodes.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented herein.

What is claimed is:

1. An electronic control unit (ECU) in a vehicle; comprising:
 a first memory configured to store a plurality of virtual-ECUs (V-ECUs);
 a processor configured to selectively run at least one of the plurality of V-ECUs;
 a security peripheral configured to store, in a second memory, (i) a single key for generating message authentication codes (MACs), the single key shared by the plurality of V-ECUs for sending authorized messages, and (ii) a MAC Generate Allow List (MGAL), the security peripheral further configured to receive a MAC generation request from an identified V-ECU of the plurality of V-ECUs, wherein the MGAL comprises information relevant to an authentication policy, the information being sufficient to determine whether the identified V-ECU is permitted to send a message; and a crypto engine coupled to the processor and configured to receive one or more shared secret keys used to verify MACs transmitted by other nodes, wherein the security peripheral is configured to use the single key to generate a MAC authenticating the message when the identified V-ECU is permitted to send the message.

2. The ECU of claim 1, wherein the identified V-ECU further sends the message along with the MAC generation request.

3. The ECU of claim 1, wherein the authentication policy comprises which V-ECUs within the ECU are authorized to generate MACs for which messages based on at least a message identifier (ID).

4. The ECU of claim 1, wherein the authentication policy comprises which V-ECUs within the ECU are authorized to generate MACs for which messages based on a message header, when the message comprises a service discovery message.

5. The ECU of claim 1, wherein the crypto engine is further configured to receive one or more restrictions that help ensure that the received one or more shared secret keys are not used for MAC generation by one V-ECU to spoof another V-ECU or another node.

6. The ECU of claim 1, wherein the processor is configured to optimize performance of the ECU by only performing access request inspections for MAC generation requests by one or more of the plurality of V-ECUs.

7. The ECU of claim 1, wherein a number of key slots used is reduced without degrading a level of security provided by having the single key.

8. The ECU of claim 1, further comprising a network interface coupled to the processor, the first memory, and the second memory and configured to transmit and receive messages to and from other nodes in a network of nodes.

9. A method of an electronic control unit (ECU) node in a vehicle, comprising:
storing a secret key in a security peripheral of the node, the secret key being shared among virtual electronic control units (V-ECUs) in the node for transmitting messages;
sending, by one of the V-ECUs, a request to the security peripheral to generate a message identification code (MAC) to accompany a protected message to be sent by the one of the V-ECUs;
identifying the one of the V-ECUs by the security peripheral;
determining, by the security peripheral, whether a message is authorized to be sent by the identified one of the V-ECUs;
receiving, at a crypto engine, shared secret keys used to verify MACs transmitted by other nodes along with restrictions ensuring that the shared secret keys are not used for MAC generation to spoof other nodes or V-ECUs;
generating the MAC if the message is deemed authorized; and
not generating the MAC if the message is deemed unauthorized.

10. The method of claim 9, wherein the identifying and determining are based on a policy that indicates which V-ECUs within the node are able to generate MACs for which messages;
wherein the policy is further based on a message identifier or a message header.

11. The method of claim 9, further comprising using the same key by a recipient V-ECU within the node to authenticate messages from a transmitting V-ECU.

12. The method of claim 9, further comprising performing access request inspections only for MAC generate requests.

13. An electronic control unit (ECU) in a vehicle, comprising:
a processor;
a security peripheral coupled to the processor;
at least one memory coupled to the processor, wherein the memory comprises a plurality of virtual ECUs (V-ECUs), each of which, when loaded into the processor as executable code and when having a secure message to transmit, is configured to issue a message authentication code (MAC) request to the security peripheral with a shared transmit key; and
a crypto engine configured to receive shared secret keys used to verify MACs transmitted by other nodes,
wherein the security peripheral is configured to verify the MAC request and to use a policy to identify one of the V-ECUs that sent the MAC request and to determine whether one of the V-ECUs is authorized to send the secured message to an identified recipient;
wherein the security peripheral generates the MAC upon authorizing one of the V-ECUs.

14. The ECU of claim 13, wherein the security peripheral uses information in a MAC Generate Allow List (MGAL) to confirm that one of the V-ECUs is entitled to send the secured message.

15. The ECU of claim 13, wherein the security peripheral comprises a portion in memory having a MAC Generate Allow List (MGAL), the MGAL comprising information relevant to levels of authorization of each of the V-ECUs stored within the ECU.

16. The ECU of claim 15, wherein the policy is implemented, at least in part, using the MGAL.

17. The ECU of claim 13, wherein the crypto engine is configured with a policy that ensures that the received shared secret keys used to verify MACs are not used to generate MACs to spoof other nodes.

* * * * *